(12) United States Patent
Beaudoin et al.

(10) Patent No.: US 8,336,335 B2
(45) Date of Patent: Dec. 25, 2012

(54) OVEN AND OXY-COMBUSTIBLE METHOD FOR MELTING VITRIFIABLE MATERIALS

(75) Inventors: Philippe Beaudoin, Guyancourt (FR); Gabriel Constantin, Buc (FR); Pascal Duperray, Montigny le Bretonneux (FR); Son Ha Giang, Sucy-En-Brie (FR); Benoit Grand, Versailles (FR); Luc Jarry, Meudon (FR); Robert Kalcevic, Versailles (FR); Bertrand Leroux, Linas (FR); Alban Poirier, Le Chesnay (FR); Rémi Tsiava, Saint Germain-les-Corbeil (FR)

(73) Assignee: L'Air Liquide Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 12/668,146

(22) PCT Filed: Jul. 10, 2008

(86) PCT No.: PCT/FR2008/051304
§ 371 (c)(1),
(2), (4) Date: Jun. 7, 2010

(87) PCT Pub. No.: WO2009/010697
PCT Pub. Date: Jan. 22, 2009

(65) Prior Publication Data
US 2010/0257899 A1    Oct. 14, 2010

(30) Foreign Application Priority Data
Jul. 10, 2007    (FR) .................................... 07 56398

(51) Int. Cl.
*C03B 5/16*    (2006.01)
(52) U.S. Cl. ..................... 65/134.4; 65/136.3; 65/134.6; 65/135.9
(58) Field of Classification Search ................. 65/135.9, 65/136.3, 335, 135.6, 134.4
See application file for complete search history.

(56) References Cited

U.S. PATENT DOCUMENTS 3,420,653 A * 1/1969 Boettner .......................... 65/335
3,592,622 A * 7/1971 Shepherd ..................... 65/136.3
5,417,732 A   5/1995 Shamp et al.
(Continued)

FOREIGN PATENT DOCUMENTS
EP    0 763 692    3/1997
(Continued)

OTHER PUBLICATIONS
International Search Report for PCT/FR2008/051304.
(Continued)

*Primary Examiner* — Matthew Daniels
*Assistant Examiner* — Yana Belyaev
(74) *Attorney, Agent, or Firm* — Christopher J. Cronin

(57) ABSTRACT

The invention relates to a method for melting vitrifiable materials in a low-capacity oven, wherein at least part of the melting energy is supplied by two oxy-burners projecting into the melting chamber through the upstream wall and arranged on opposite sides of a vertical plane in which a longitudinal axis of the melting chamber is situated, in such a way as to create two flames, the respective injection axes thereof crossing at a distance from the upstream wall, between ⅓ and ¾ of the length L of the melting chamber.

10 Claims, 1 Drawing Sheet

U.S. PATENT DOCUMENTS

| | | | |
|---|---|---|---|
| 5,807,418 | A | 9/1998 | Chamberland et al. |
| 5,906,119 | A | 5/1999 | Boillet |
| 6,071,116 | A | 6/2000 | Philippe et al. |
| 6,079,229 | A | 6/2000 | Legiret et al. |
| 6,190,158 | B1 | 2/2001 | Legiret et al. |
| 6,250,916 | B1 | 6/2001 | Philippe et al. |
| 6,532,771 | B1 * | 3/2003 | Kobayashi et al. .......... 65/134.4 |
| 6,685,461 | B2 | 2/2004 | Rio et al. |
| 6,910,879 | B2 | 6/2005 | Dugue et al. |
| 2007/0172781 | A1 | 7/2007 | Tsiava et al. |

FOREIGN PATENT DOCUMENTS

| | | | |
|---|---|---|---|
| EP | 0872690 | * | 1/1998 |
| EP | 0 872 690 | | 10/1998 |
| FR | 2 837 916 | | 10/2003 |
| FR | 2 903 479 | | 1/2008 |
| WO | WO 2004/094902 | | 11/2004 |
| WO | WO 2008/003908 | | 1/2008 |

OTHER PUBLICATIONS

Baukal, Jr., Charles E., "Oxygen-Enhanced Combustion," Chapter 7, ISBN: 0/8493-1695-2, CRC Press, 1998.

Damsell, Mike, "Oxygen firing in glass melters," Glass International, Mar. 1998, pp. 35-37.

Hope, Stephen, "Oxy-fuel boosting maximises productivity," GLASS, Jun. 1998, pp. 170-171.

Hope, Stephen, "Oxygen-fuel boosting on float furnaces," International Glass Review, Spring/Summer 1997, pp. 63-66.

* cited by examiner

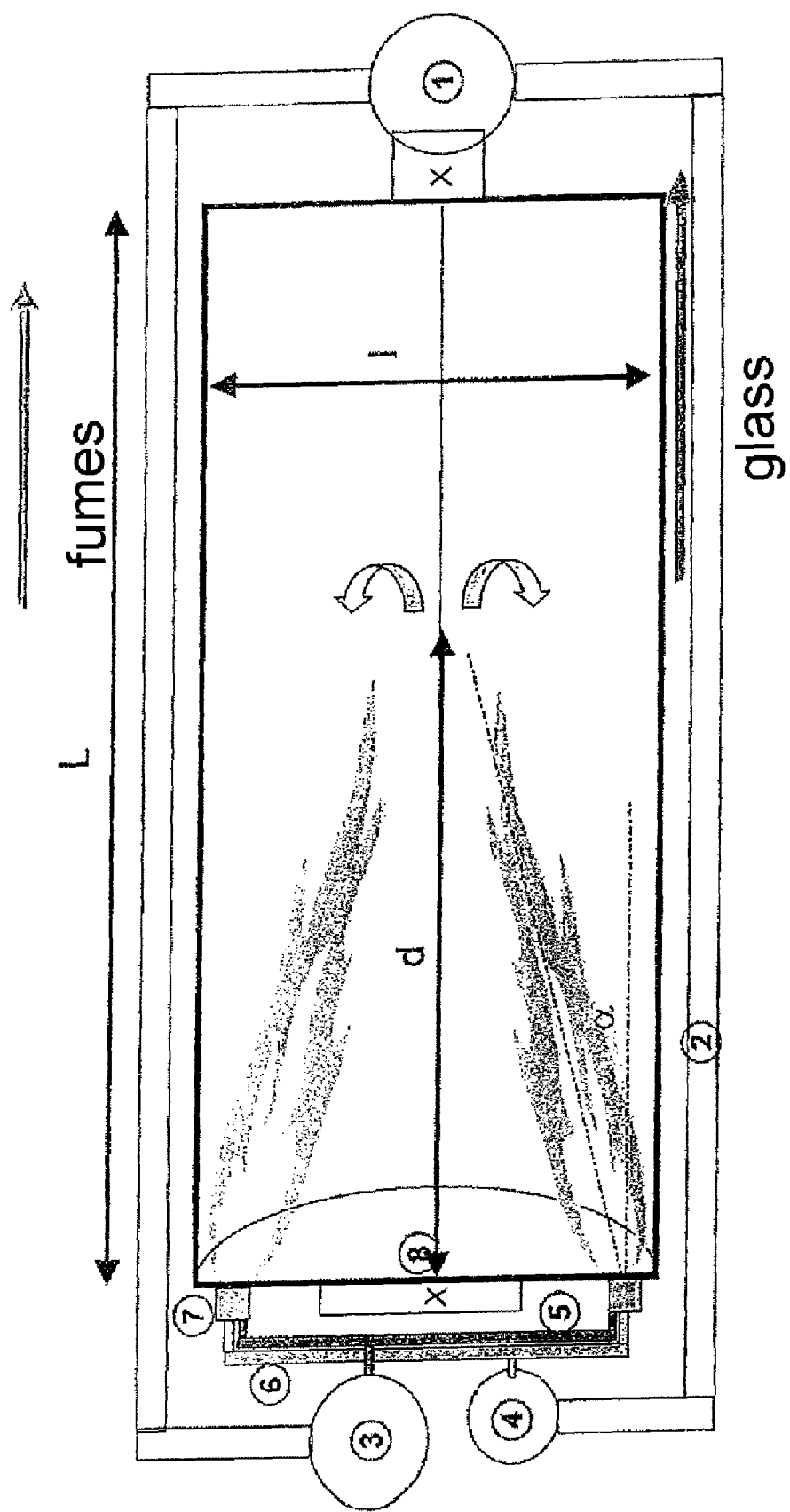

OVEN AND OXY-COMBUSTIBLE METHOD FOR MELTING VITRIFIABLE MATERIALS

CROSS-REFERENCE TO RELATED APPLICATIONS

This application is a §371 of International PCT Application PCT/FR2008/051304, filed Jul. 10, 2008.

BACKGROUND

The invention relates to a method and an oxy-fuel oven for melting a vitrifiable material and for obtaining molten glass.

The invention notably relates to a melting oven having a capacity or output less than or equal to 400 tonnes of molten glass a day. Such melting ovens are for example used in the production of hollow glassware or glass tableware where they feed forming machines with molten glass.

The invention relates more particularly to such a melting oven called a "flame oven". In a flame oven, at least part of the melting energy is provided by at least one flame in the melting chamber, said at least one flame being produced by means of a burner.

In order to reduce polluting emissions, such as NOx, and in order to reduce the energy consumption of flame melting ovens, it is possible to replace air as the oxidant for combustion by an oxygen-rich gas. Such ovens are called oxy-fuel flame ovens. Combustion by means of an oxygen-rich gas is called oxy-combustion and burners operating with an oxygen-rich gas as oxidant are called oxy-burners.

In oxy-combustion ovens, the configuration of the burners is generally made up of a number of burners placed on part of the length of the oven and directed perpendicularly to the axis of the oven/combustion chamber. The power of each of the burners is individually adjusted, or adjusted by group of burners, in order to establish the desired thermal profile in the oven. The total power of the burners is adjusted according to the oven's output.

Other burner configurations have been proposed.

Melting ovens thus exist called "loop ovens" in which (1) the configuration of the burners consists of a very small number of burners (typically one or two) directed substantially parallel to the longitudinal axis of the oven and (2) the opening or openings for discharging fumes are positioned so as to create one or more flames in the form of a loop.

SUMMARY OF THE INVENTION

The object of the present invention is to provide an improved oxy-fuel method for the melting of vitrifiable materials in a limited capacity oven, as well as an improved limited capacity melting oven capable of being used in such a method.

The present invention relates more particularly to a method for obtaining molten glass by fusing vitrifiable materials in a melting chamber.

The melting chamber is defined by an upstream wall (also called a charging wall or back wall), a downstream wall (also called an exit wall or front wall), side walls, a hearth and a roof. It has an internal surface area of less than or equal to 200 m² and its longitudinal axis extends between the upstream wall and the downstream wall. The melting chamber has an upstream zone beside the upstream wall and a downstream zone beside the downstream wall.

In the method according to the invention, vitrifiable materials are charged into the upstream zone. The vitrifiable materials are melted to obtain molten glass by providing fusion energy in the melting chamber. Molten glass is removed from the downstream zone.

At least part of the fusion energy is provided by two oxy-burners. The two oxy-burners emerge in the melting chamber and are situated either side of the vertical plane comprising the longitudinal axis of the melting chamber (that is to say the vertical plane in which said longitudinal axis is situated). In order to provide said at least part of the fusion energy, the two oxy-burners are fed with fuel and oxidant and fuel and oxidant are injected into the melting chamber by means of these two oxy-burners so as to create two flames and fumes. Each of the two flames has an injection axis. The oxidant is an oxygen-rich oxidant and in particular an oxidant of which the oxygen content is at least 70% v/v.

Fumes are discharged from the melting chamber by means of a fume discharge opening.

The invention is notably wherein the injection axes of the two flames meet at a distance d from the upstream wall between ⅓ and ¾ of the length L of the melting chamber.

The internal surface area of the melting chamber is preferably 10 to 90 m².

The oxidant preferably has an oxygen content of at least 80% v/v.

The two oxy-burners are preferably positioned symmetrically either side relative to the vertical plane comprising the longitudinal axis of the melting chamber.

The injection axes of the two flames preferably meet at a distance d from the upstream wall by approximately ⅔ of the length L of the chamber (between 7/12 and 9/12 of the length L of the chamber).

The injection axes of the two flames meet preferably in the vertical plane comprising the longitudinal axis of the melting chamber.

The injection axis of the flame is understood to mean the initial orientation or direction of the flame, which is to say at the outlet from the burner.

The method according to the invention has a number of advantages.

It has in point of fact been found that, in an oven with such an internal surface area, the method according to the invention with the orientation of the two flames as described above, with notably injection axes that meet in the oven, permits more efficient heat transfer to the charge, in this way making it possible to achieve a higher pull rate for the oven and/or better quality of the molten glass, notably as regards the uniformity of the composition and the temperature of the molten glass leaving the oven, or furthermore of achieving fuel savings.

This orientation of the two flames with a meeting point that creates a high temperature combustion zone notably improves the control over the flow of melting glass in the glass bath and its uniformity. This orientation also makes it possible to increase the dwell time of fumes above the charge, in this way improving heat transfer to the charge and reducing the temperature of the fumes leaving the oven.

On account of the fact that, for a given power, the gas volumes (notably oxidant and fumes) in oxy-combustion are strongly reduced relative to the gas volume in air-combustion, the risk is reduced of entraining vitrifiable materials or a component of the molten glass with the flame and fumes, in view of the orientation of the two flames, and on account of this the risk of damaging the walls of the melting chamber and producing losses of vitrifiable materials and/or components.

Another advantage of the present invention is that it is possible to carry out maintenance of one or both burners or devices for feeding fuel and/or oxidant for one of the two burners, without having to interrupt melting and thus without cooling the oven, which may lead to emptying the melting bath of melting vitrifiable materials and molten glass, in this way avoiding stoppages and considerable production losses.

The presence of two oxy-burners emerging in the melting chamber through the upstream wall makes it possible to switch power onto the other of the two oxy-burners when one of the oxy-burners is out of action or for maintenance or for maintenance of its supply means or even for maintenance of the means for preheating fuel and/or oxidant fed into said oxy-burner.

The power of the burner put out of action may be partially or totally compensated for by the other of the two burners.

The oxygen content of the oxidant is advantageously greater than 85% v/v, preferably at least 90% v/v and more preferably at least 95% v/v or even at least 99% v/v.

According to one particularly advantageous embodiment that increases the flexibility of the method and of the oven according to the invention, the two oxy-burners are oxy-burners with a rotatable flame, that is to say oxy-burners that make it possible to vary the direction of the injection axis of the flame. Such burners with a rotatable flame are notably described in patent applications WO 2008/003908 and FR 2 903 479 by the L'Air Liquide company. Use of this type of burner makes it possible in particular to move the place in the melting chamber where the injection axes of the two flames meet. This makes it possible for example to take account of changes in the output of the oven and/or the composition of the vitrifiable materials.

Preferably, at least part of the fumes discharged is conveyed to heat recovery means.

It is possible to improve still further the energy balance of the fusion method by preheating at least part of the reactants (oxidant and/or fuel) and in particular part of the oxidant, upstream of the two burners. Said preheating is advantageously carried out in the heat recovery means and notably by using one or more heat exchangers. These heat exchangers are typically placed on the circuit for discharging fumes downstream of the oven.

This technique of preheating the reactants makes it possible to achieve a gain of approximately 10% in oxygen and fuel consumption. The exact gain is a function of the temperature level reached by the reactants, the design of oven and the type of burner used.

In order to make the installation of such oxy-combustion technology with hot reactants of value and profitable for small-size ovens, in spite of the complexity of its implementation, the cost of the installation compared with savings generated and the overall size of the preheating installation, it is proposed, according to one of the embodiments of the invention, that the heat recovery means comprise at least one heat exchanger situated outside the melting chamber and essentially behind the upstream wall in which the two oxy-burners and at least part, and preferably all, the oxidant provided to said two oxy-burners is preheated in the at least one first heat exchanger by heat exchange with a heat transfer fluid.

The invention thus makes it possible to benefit from the energy gain provided by the technique of preheating the reactants in an oven with a small capacity melting chamber, and this with a relatively simple means of application and reasonable installation cost and without too large a size.

It should be noted that in the present context, the term "melting chamber" also covers melting/refining chambers.

The method according to the invention is carried out with a melting chamber that is a low capacity chamber. The chamber typically has a capacity or output less than or equal to 400 tonnes of molten glass a day, preferably 50 to 200 tonnes a day. This generally corresponds to a chamber having an internal surface area (=length L ×width l) less than or equal to 200 $m^2$, and preferably 10 to 90 $m^2$.

Hereinafter, the term "low capacity chamber" refers to a chamber according to any one of the above descriptions.

Each of the two oxy-burners is provided with means for supplying fuel enabling the flow of fuel conveyed to said burner to be regulated.

It has in particular been found that it is possible, in low capacity chambers, to achieve good coverage of the charge (vitrifiable materials and molten glass) by the flames and a good thermal profile with two staged and/or variable impulse oxy-burners mounted in the upstream wall.

Staged combustion is combustion in two successive combustion zones. In the first combustion zone, one of the reactants (fuel or oxidant) is injected in a quantity less than the stoichiometric quantity for combustion. In this first zone, combustion is rich in fuel (in the case of sub-stoichiometric injection of oxidant or more particularly oxygen) or combustion is rich in oxygen (in the case of sub-stoichiometric injection of fuel). The complement of the reactant injected sub-stoichiometrically is injected away from the first combustion zone, in this way creating a second combustion zone in which the complement of the reactant injected sub-stoichiometrically reacts with the residue from the combustion of the first zone and notably with the residue in the fumes from the other reactant.

More often, the reactant injected sub-stoichiometrically into the first combustion zone is the oxidant.

Staged combustion burners, also called "separate jet burners" that may advantageously be used in the method and oven according to the invention are notably described in WO-A-02/081967, WO-A-2004/094902 and WO-A-2005/059440 in the name of the Applicant and are marketed by the applicant company under the trade name Alglass™ Sun.

The staged combustion oxy-burners have the following advantages:
  flexible power, that may notably be adapted to variations in the required output for the oven,
  an adjustable flame length.

These burners make it possible in particular to vary flame length independently of the operating power and in this way to distribute heating over the length of the chamber.

Variable impulse burners having or not having an oxygen lance to reinforce flexibility, make it possible to adjust the flame length by regulating the speed of injection of reactants (oxidant and fuel). Impulse staged burners also make it possible to vary flame length independently of operating power. The fuel is more often a gaseous fuel.

Variable impulse burners that may advantageously be used in the method and oven according the invention are notably described in FR-A-2 837 916, EP-A-1 195 557, EP-A-0 763 692 and EP-A-1 016 825 in the name of the Applicant and are marketed by the applicant's company under the trade name Alglass™ VM.

It should be noted that, although the invention makes it possible to achieve good coverage of the bath and therefore of the charge (vitrifiable materials and molten glass) by the two flames and a good thermal profile with two oxy-burners mounted in the upstream wall, this does not exclude the presence of other burners and/or injectors or lances for fuel and/or oxidant in the melting chamber and notably in the downstream zone, notably in the refining zone in the case of a melting/refining chamber.

However, the two oxy-burners mounted in the upstream wall usefully supply at least 60% of the fusion energy in the chamber, preferably at least 70%, and more preferably at least 80%.

It is envisaged to provide at least 90%, or even all the fusion energy in the chamber by means of these two oxy-burners mounted in the upstream wall.

By virtue of the positioning of the two oxy-burners in the upstream wall, it is possible to position the at least one heat exchanger for preheating at least part of the oxidant for these oxy-burners essentially, and preferably entirely, behind the upstream wall (seen from inside the chamber or in its position in front of the downstream wall) and in this way to limit the overall size.

The at least one first heat exchanger situated behind the upstream wall may be a direct exchanger traversed by discharged fumes in which at least part of the oxidant is preheated by heat exchange with said fumes, said fumes being in this case a heat exchange fluid. Although this solution has a reasonable cost, it does not however seem to provide a sufficient level of security.

Preferably, the at least one first exchanger situated behind the upstream wall is preferably an indirect exchanger. In this case at least part of the oxidant is preheated by heat exchange with a heat transfer fluid other than the fumes, said heat exchange fluid having in its turn recovered heat energy from the fumes by a second heat exchange.

Heat exchange between the at least part of the oxidant and the heat transfer fluid and heat exchange between the heat transfer fluid and the fumes may be carried out in the same (first) heat exchanger or in two separate exchangers, at least the exchanger for heat exchange between the heat transfer fluid and the oxidant (first exchanger) being positioned essentially behind the upstream wall.

U.S. Pat. No. 6,071,116 and U.S. Pat. No. 6,250,916 by the Air Liquide company describe indirect heat exchange devices that may advantageously be used within the context of the present invention.

Preferably, at least part, and preferably all, the fuel is preheated before it is fed to the two oxy-burners in at least one first heat exchanger situated outside the chamber and essentially behind the upstream wall. The above considerations concerning preheating the oxidant also apply to preheating the fuel.

The method may be carried out with various fuels. Gaseous fuels are preferred.

At least part of said oxidant is, as described above, advantageously preheated by indirect heat exchange with the discharged fumes, which makes it possible to increase the reliability and security of the method.

In order to increase the energy gain, it is also possible to preheat at least part of said fuel by heat exchange with a heat transfer fluid in at least the first heat exchanger, this preheating being also preferably carried out by indirect heat exchange with the discharged fumes.

Indirect heat exchange may be carried out in a single heat exchanger in which the heat transfer fluid is heated by direct heat exchange with the discharged fumes, and the oxidant, and possibly the fuel, are heated by direct heat exchange with the heat transfer fluid heated in this way. However, it is often useful to carry out the two direct heat exchanges in two separate exchangers.

Thus, according to one embodiment of the method, a heat transfer fluid such as air or an inert gas is heated by heat exchange with at least part of the discharged fumes and at least one second heat exchanger situated close to the at least one discharge opening. The heat transfer fluid is led to the at least first heat exchanger situated behind the upstream wall where preheating occurs of at least part of said oxidant and possibly at least part of said fuel.

According to an alternative embodiment of the method, at least part of the discharged fumes is led to at least one second heat exchanger situated close to the upstream wall, it being possible for this at least one heat exchanger to be notably also positioned essentially behind the upstream wall. A heat transfer fluid such as air or an inert gas is heated by heat exchange with at least part of the discharged fumes in the at least one second heat exchanger. The heated heat transfer fluid is led toward the at least one first heat exchanger situated behind the upstream wall for preheating at least part of said oxidant and possibly at least part of said fuel.

The present invention also relates to an oven for melting vitrifiable materials and for obtaining molten glass enabling the method described above to be implemented.

The oven according to the invention has a melting chamber defined by an upstream wall, a downstream wall, sidewalls, a hearth and a roof, and having an upstream zone beside the upstream wall and a downstream zone beside the downstream wall. This chamber has an internal surface area less than or equal to 200 m$^2$.

The melting oven also has an opening for charging vitrifiable materials situated in the upstream zone, and at least one outlet for molten glass being situated in the downstream zone.

The oven according to the invention also has at least one opening for discharging fumes and means for recovering heat from the discharged fumes.

The oven also has two oxy-burners that emerge in the melting chamber through the upstream wall and that are situated either side of the plane comprising the longitudinal axis of the melting chamber. Each of these two oxy-burners is equipped with means for feeding in oxidant and means for feeding in fuel.

The oven according to the invention is characterized notably in that the two oxy-burners that emerge in the melting chamber through the upstream wall have oxidant and fuel injectors so as to be able to produce flames in the combustion chamber along the injection axes that meet at a distance d from the upstream wall between $\frac{1}{3}$ and $\frac{3}{4}$ of the length L of the chamber.

The internal surface area of the melting chamber is preferably 10 to 90 m$^2$.

The two oxy-burners are preferably positioned symmetrically either side of the vertical plane comprising the longitudinal axis of the melting chamber.

The injection axes of the two flames preferably meet at a distance d from the upstream wall of approximately $\frac{2}{3}$ of the length L of the chamber (between $\frac{7}{12}$ and $\frac{9}{12}$ of the length L of the chamber).

The injection axes of the two flames preferably meet in the vertical plane comprising the longitudinal axis of the melting chamber.

The means for feeding in oxidant are connected to an oxidant source having an oxygen content of at least 70% v/v. This oxygen content is usefully greater than 80%. It may notably be greater than 85% v/v, preferably at least 90% v/v, more preferably at least 95% v/v or even at least 99% v/v.

The means for feeding in fuel are preferably connected to a source of gaseous fuel. However, the invention is not limited to melting ovens operating with a gaseous fuel, but also include ovens operating with other fuels, such as liquid fuels.

The two oxy-burners are preferably staged and/or variable impulse combustion oxy-burners.

The means for recovering heat from the discharged fumes advantageously comprise at least one heat exchanger, said at least one heat exchanger being situated outside the melting chamber and essentially behind the upstream wall. A least part of the means for feeding in oxidant are connected to said at least one heat exchanger so as to enable at least part of the oxidant to be preheated by heat exchange with a heat transfer fluid.

Advantageously, at least part of the means for feeding in fuel are connected to said at least one heat exchanger so as to enable at least part of the fuel to be preheated by heat exchange with a heat transfer fluid.

At least one first heat exchanger may be a direct or indirect heat exchanger.

According to an embodiment enabling at least part of the oxidant and possibly at least part of the fuel to be preheated indirectly, the oven also has:
- at least one second heat exchanger situated close to the at least one opening for discharging fumes for heating a heat transfer fluid by heat exchange with at least part of the discharged fumes,
- ducts enabling the heated heat transfer fluid to be led to the at least one first heat exchanger situated behind the upstream wall.

According to an alternative embodiment, the oven has:
- at least one second heat exchanger situated close to the upstream wall for heating a heat transfer fluid by heat exchange with at least part of the discharged fumes,
- ducts enabling the at least part of the fumes evacuated through the evacuation opening to be led to the at least one second heat exchanger,
- ducts enabling the heated heat transfer fluid to be led to the at least one first heat exchanger situated behind the upstream wall.

The melting oven is usefully an oven for the production of hollow glassware or glass tableware designed to feed forming machines with molten glass.

The invention is illustrated hereinafter by a specific example of an embodiment of the invention, reference being made to the figure that is a schematic representation of a cross section of a melting oven according to the invention.

BRIEF DESCRIPTION OF THE FIGURES

FIG. 1 is a schematic representation of a cross section of a melting oven according to the invention.

DETAILED DESCRIPTION OF THE INVENTION

As illustrated in the figure, the melting chamber, which is a melting/refining chamber, has a length L and a width 1. The chamber is equipped with two staged combustion oxy-burners 7 emerging in the melting chamber through the upstream wall. Said oxy-burners are positioned symmetrically either side of the vertical plane comprising the longitudinal axis X-X of the chamber.

Each of the two oxy-burners has a block made of refractory material having a first passage for injecting fuel, a passage or "sheathing" with an annular section around said first passage for injecting the primary oxidant, passages for injecting the secondary oxidant at a short distance from the first passage and at a long distance from the first passage.

The applicant company markets burners having refractory blocks under the trade name Alglass™ Sun, each block having passages for fuel and oxygen as described above, and thus being able to be used as one of the two oxy-burners according to the invention. In this case, it will be considered, within the context of the present invention, that each of the two blocks alone constitutes an oxy-burner.

The opening for discharging fumes is situated in the downstream wall.

The discharged fumes are led to the fumes/air recuperator or second heat exchanger 1 situated close to the discharge opening. In this second heat exchanger, air used as the heat transfer fluid is heated by heat exchange with the discharged fumes.

The hot air obtained in this way is led through the ducts 2 to the first two heat exchangers 3 and 4 positioned behind the upstream wall.

In the air/oxygen exchanger 3 the oxygen oxidant is preheated by heat exchange with hot air before being led through the oxygen connection to the two oxy-burners 7.

The natural gas fuel is preheated by heat exchange in the air/natural gas exchanger 4 with preheated air before being led through the natural gas connection to the oxy-burners 7.

The two oxy-burners 7 are directed so that the flame injection axes of the two burners meet at an intersection point situated in the vertical plane comprising the longitudinal axis X-X of the chamber, so that a hot point is created there.

The angle α of said burners is chosen according to the desired location of the hot point. For example, for a hot point situated at a distance $d=2\times L/3$, $\tan \alpha = 1/(2\times d) = 3\times l/(4\times L)$.

According to an example of the method and oven according to the invention, the melting chamber has a length of 9 m and a width of 4.5 m.

The parameters of this method are given in the following table:

| | | |
|---|---|---|
| Fumes | Composition: | 37% v/v $CO_2$, 50% v/v $H_2O$, 9% v/v $N_2$, 5% v/v $O_2$ |
| | Temperature | 1350° C. to 1450° C. |
| | Flow rate: | ≦20000 $Nm^2/h$ |
| Oxidant | Composition: | Oxygen (>90% v/v) |
| | Preheating temperature: | 550° C. |
| Fuel (natural gas) | Composition: | Natural gas |
| | Preheating temperature: | 450° C. |
| Heat transfer fluid | Composition: | Air |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for obtaining molten glass by melting vitrifiable materials in a melting chamber defined by an upstream wall, a downstream wall, side walls, a hearth and a roof and having a length L and an internal surface area of less than or equal to 200 $m^2$, said chamber having an upstream zone beside the upstream wall, a downstream zone beside the downstream wall and having a longitudinal axis that extends between the upstream wall and the downstream wall, said method comprising the steps of:
   a) the vitrifiable materials are charged into the upstream zone,
   b) the vitrifiable materials are melted to obtain molten glass by providing melting energy in the melting chamber, at least 70% of the melting energy being provided by:
      i) supplying two oxy-burners with fuel and oxidant, said oxidant having an oxygen content of at least 70% v/v, and ii) injecting fuel and oxidant into the melting chamber with said two oxy-burners so as to create two flames having an injection axis and fumes, the two oxy-burners emerging in the melting chamber through the upstream wall and being situated on opposite sides of a vertical plane in which a longitudinal axis of the melting chamber is situated;

c) molten glass is discharged from the downstream zone, and d) fumes are discharged from the melting chamber by means of at least one opening for discharging fumes, wherein:

the injection axes of the two flames meet at a distance d from the upstream wall between ⅓ and ¾ of the length L.

2. The method of claim 1, wherein:

at least part of the discharged fumes are conveyed to at least one heat exchanger; and at least part of the oxidant is preheated in the at least one heat exchanger before it supplies the two oxy-burners.

3. The method of claim 2, wherein the at least one heat exchanger comprises a first heat exchanger situated outside the melting chamber and behind the upstream wall.

4. The method of claim 3, wherein at least part of the oxidant is preheated by heat exchange with a heat transfer fluid in first heat exchanger before supplying the two oxy-burners.

5. The method of claim 4, wherein:

the at least one heat exchanger further comprises a second heat exchanger situated close to the at least one discharge opening;

heat transfer fluid is heated by heat exchange with at least part of the discharged fumes in the second heat exchanger; and the heated heat transfer fluid is led to the at least first heat exchanger situated behind the upstream wall for pre-heating at least part of said oxidant and possibly at least part of said fuel.

6. The method of claim 4, wherein:

the at least one heat exchanger further comprises a second heat exchanger situated close to the upstream wall;

at least part of the discharged fumes is led to the second heat exchanger;

the heat transfer fluid is heated by heat exchange with at the least part of the discharged fumes in the second heat exchanger; and the heated heat transfer fluid is led to the first heat exchanger for preheating at least part of said oxidant and optionally at least part of said fuel.

7. The method of claim 1, wherein the oxidant has an oxygen content of at least 90% v/v.

8. The method of claim 1, wherein the two oxy-burners are positioned symmetrically on opposite sides of the vertical plane.

9. The method of claim 1, wherein the injection axes of the two flames meet in the vertical plane.

10. The method of claim 1, wherein d is between ⅓ and ⅔ of the length L.

* * * * *